Nov. 18, 1952     H. A. MULVANY     2,618,216
PRESERVATION OF EGGS
Filed March 30, 1950
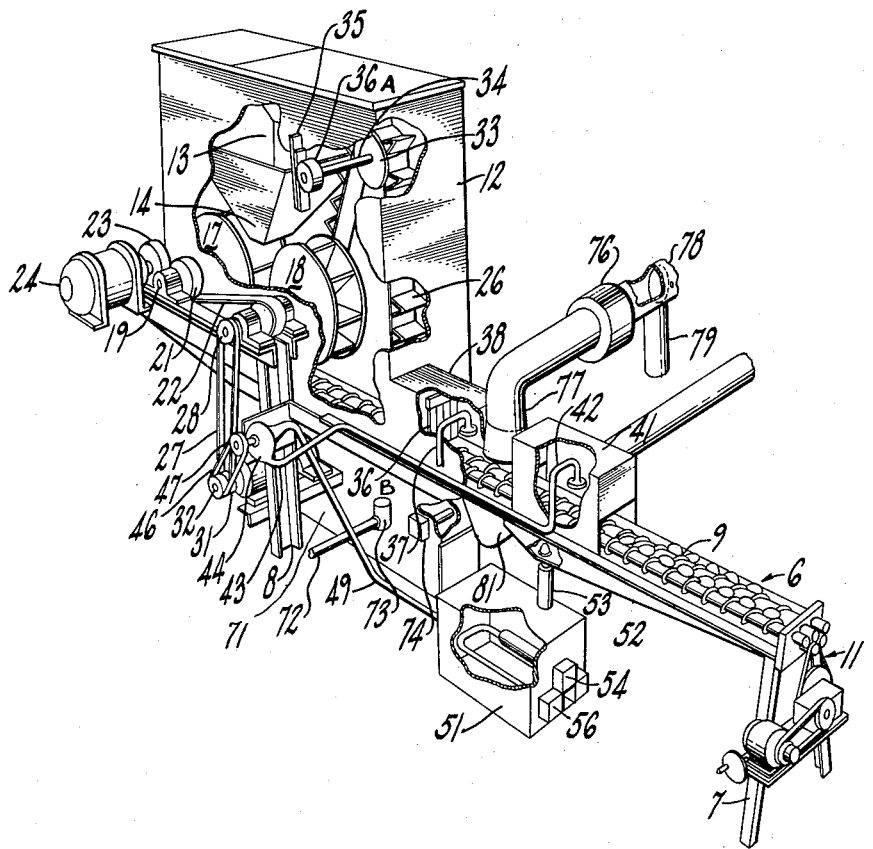
INVENTOR.
Harry A. Mulvaney
BY
ATTORNEY Patented Nov. 18, 1952

2,618,216

UNITED STATES PATENT OFFICE 2,618,216

PRESERVATION OF EGGS

Harry Alfred Mulvany, Berkeley, Calif.

Application March 30, 1950, Serial No. 152,774

1 Claim. (Cl. 99—241)

This invention relates to the cleaning and preserving of eggs.

Eggs which are soiled provide a considerable problem in the industry because the soil generally includes various bacteria which affect the egg adversely, particularly if water is used to clean the egg. This is because the wetting of the egg shell apparently distributes the bacteria more completely over the egg or eggs being cleaned; there is no harmful effect in applying water to an egg if the water and egg shell are each sterile. Many egg buyers will not handle so-called "dirty eggs" and even those that do generally confine their operations to "light-dirty" eggs and refuse all graded "heavy-dirty" eggs except at a very substantial price reduction, because of their very poor keeping qualities.

Few eggs are produced which are not soiled to some extent, making it necessary to clean them before marketing. Various types of sand-blasting of egg shells have been proposed and used. Dry sanding, while quite effective on "light-dirty" eggs, must be severely practiced to clean a "heavy-dirty" egg and has been criticized as removing too much of the egg shell. A wet sanding operation, involving a high velocity spraying of the eggs with water and sand, has proven very satisfactory insofar as cleaning is concerned, but the water has caused infection, which has limited the use of this process. The present invention, however, makes possible the use of such a wet sanding process without danger of infection of the eggs. A simple overall cleaning and process of the eggs is thus provided. Preferably, the eggs are first cleaned in a sand and water spray; then rinsed with fresh water or steam at a sterilizing temperature to remove sand and other loose adhering matter, then dried and finally sprayed with sterile oil so as to displace the water retained on the shells with the desired oil film. Eggs treated in this manner shrink at a very much lower rate than untreated eggs, and may be held for a period of weeks without undue drying and without becoming so-called "rots."

The application of heat to an egg shell must be carefully controlled for egg albumen has a critical coagulation temperature. I have determined that eggs can be rinsed with water and the infecting organisms on the shells thereof rendered harmless if the eggs are sprayed with water at its boiling point for a few seconds; I have successfully employed water at 212° F., applying this as a spray with the eggs in contact with the hot water for about three seconds. The water temperature should be such that the egg shell is rendered sterile within the shell-water contact period, the temperature and contact period being coordinated so that, advantage being taken of the relatively poor heat transfer property of the shell, the egg albumen is not coagulated or otherwise adversely affected. Water at approximately 212° F. or steam, and a few seconds contact period suffice in practice to achieve a sterile egg-shell. Thereafter, the water is removed from the shell and sterile oil applied.

The process of the present invention can be practiced readily at low cost, thereby enabling a central egg-handler to process all eggs coming into its possession and which have not been cleaned and oiled. This is of advantage for many small farmers, for example, hand wash dirty eggs with water to improve their grade. While the dirt and filth is removed from the egg shell surface, the pores of the shell still retain sufficient of the undesirable bacteria to cause egg spoilage during the period that the egg is normally in the channels of trade and distribution. Such eggs can be detected when viewed under a light corresponding to that having a wave length of approximately 4500 Angstroms; such a light is provided by a mercury lamp having a cobalt glass shield. A truly clean egg will appear as a fresh pink color under such a light, while an apparently clean egg, but which has been washed ineffectively, will be of a color from a flat dead-white to a gold, depending on the nature of the filth originally present. By viewing the eggs under such a light, one can readily separate truly clean eggs from those which are in fact "dirty," even though the latter, to the unaided eye, may appear as clean and even cleaner than the truly clean eggs. In this manner, eggs, having their shells free from any bacteria, can be provided and placed in the channels of trade and on their way to the consumer.

It is an object of the present invention to provide a process for cleaning dirty eggs and to provide a clean, sterile, oil-coated egg as the product thereof.

Another object of the invention is to provide a process of the character described which is adapted for relatively low cost and continuous large production of processed eggs.

The invention possesses other objects and features of advantage, some of which, with the foregoing, will be set forth in the following description of the preferred form of the invention which is illustrated in the drawing accompanying and forming part of the specification. It is to be understood, however, that variations in the process as described hereunder may be adopted within the scope of the invention as set forth in the claim.

Referring to the drawing accompanying and forming a part hereof, the single figure is a perspective view of an apparatus, shown partly in diagrammatic form, for carrying out the process of the present invention.

Briefly, the present invention contemplates the wet-sanding of the eggs, as with the machine shown in my Patent 2,225,482, washing the eggs with sterilizing water or steam to remove adhering sand and oiling the eggs with a sterile oil to displace the water film on the shell surface. In the drawing, the machine depicted embodies one embodiment of means for practicing the invention.

Referring to the drawings, the machine there shown diagrammatically includes a frame structure generally indicated at 6 supported upon suitable vertical supports 7 and 8 and having several spiral conveyors 9 arranged horizontally to transport eggs from one end of the machine to the other, the spiral conveyors being driven by a drive mechanism positioned at the front of the machine and generally indicated at 11. At the rear of the frame 6 is provided a housing 12 containing a hopper 13 having a discharge 14 feeding down between two cooperatively positioned centrifugal rotors 17 and 18, as is further disclosed in the aforementioned patent. The rotors are each mounted upon shafts 19 carrying pulleys 21 thereon which are driven by belt 22 extended about each of the pulleys and about a pulley 23 on a shaft on the electric motor 24. Sand and water, discharged into the hopper 13, are discharged down between the rotors 17 and 18, to be ejected with sufficient force by these upon eggs passing along beneath the rotors on the spiral conveyors 9 to remove any adhering foreign matter. The sand is collected and washed with water, as is disclosed in the aforementioned patent, in the bottom or tank portion 71 of the housing 12 and the sand and water are returned to the hopper 13 as by a bucket elevator generally indicated at 26, this being driven by a belt 27 extended about a pulley 28 on one of the shafts 19, the belt 27 extending about a pulley 31 on a counter shaft 32. At its upper end, the conveyor 26 passes about a wheel 33 supported upon a shaft 34. The shaft carries an eccentric 36R adapted to bear against members 35 mounted upon the hopper 13 to vibrate this and ensure that the wet sand feeds down upon the rotors. Issuance of air and sand from the housing 12 is prevented by a flexible cover 36B provided over the opening from the housing in the direction of advance of the eggs.

Immediately adjacent to the point whereat the eggs issue from the housing 12, I provide a nozzle 37 to spray sterilizing water or steam down upon the eggs and wash off any sand or other loose adhering material, the spray nozzle being provided within a suitable housing 38. The water or steam supplied to nozzle 37 is heated to a temperature whereat it is sterile and whereat it is effective to render harmless within a contact period of a few seconds any organism usually found on the shell of a fresh egg. Water at 140° F. will render harmless the usual organisms found on the egg shell, particularly pseudomonysis bacteria, that causing egg rot. However, it is preferred to employ a higher temperature and one can even utilize dry steam, which is preferred because the use of steam will ensure shell sterilization whereas water may inadvertently be applied at too low a temperature. However, rinsing of the eggs is generally required and water at or near 212° F. is satisfactory, about three seconds contact being all that is required. The water passes the eggs and the conveyor and is collected in the tank 71 where it is mixed with fresh cold water admitted from line 72 under the control of magnetically operated valve 73 which is controlled by tank thermostat 74. The water in the tank is maintained at a temperature of at least 140° F.; the sand and water utilized for sanding are subject to this temperature to prevent growth of the bacteria which otherwise affects the eggs adversely and causes rotting. The sand and water are held in the tank at a temperature whereat the growth of pseudomonysis bacteria is reduced and prevented. The possible pseudomonysis infection of the eggs from the sand and water is slight and any which occurs or which remains is destroyed subsequently by an application of water or steam at a temperature where at pseudomonysis is destroyed.

Immediately following the water or steam spray application, the eggs are dried. In the machine shown, air is applied by blower 76 through nozzle 77. The air is at a drying temperature, a portion being taken from the atmosphere through inlet 78 and another portion being taken through heater 79. An air hood 81 is provided to exhaust the wet air from the eggs to an external discharge as under application of a blower draft, which blower is not shown.

Further along the run of the conveyor I provide another housing 41 having a spray nozzle 42 therein, this being connected by pipe 43 to a pump 44 driven by a belt 46 provided about a pulley 47 on the pump shaft 48. The inlet of the pump is connected by a pipe 49 to a tank 51 wherein oil is collected from drain 52 provided below the run of the conveyor adjacent to the housing 41 and extending along the run of the conveyor to the end thereof, pipe 53 connecting this drain to the tank 51. The tank includes a thermostat 54 controlling a heating element 56 so that the oil within the tank is held at a temperature and for a time whereat it is sterile.

In operation, the eggs to be processed, preferably those which have been screened by visual observation of their shells under the cobalt-shielded mercury lamp, are placed upon the conveyor 9 which is operated continuously to subject the eggs to application of the sand and water mixture. As the eggs issue from the chamber 12, they are immediately sprayed with water or steam and any adhering sand is removed. In accordance with this invention, the water or steam is applied at a temperature whereat pseudomonysis bacteria is killed practically instantaneously; a temperature of 212° F. suffices with only a very short contact period, e. g. of the order of one second. Thereafter, the eggs are dried and are then sprayed with oil which is sterile. In accordance with this invention, the oil is preferably held to a temperature between 212° and 400° F. for a time to ensure it is sterile. At the oil spray nozzle, the hot sterile oil is either atomized with air as in a paint spray gun, or else is released under such a high pressure, e. g. 60 to 100 pounds per square inch, that it is completely atomized and is cooled, by reason of its traverse through the atmosphere, to a temperature whereat any adverse effect upon the egg is absent. In place of air, one can use any other sterile gaseous media which does not affect the oil or the eggs adversely. In place of atomizing the oil with air or another gas, one can utilize high pressure and atomize the oil mechanically, as I have depicted in the drawing, by reason of the release of a high pressure, one of the order of 1,000 pounds per square inch. In any case, the application of the hot sterile oil suffices to cause the oil film to displace any water remaining in the egg shell and to continue the sterilizing of the egg shell.

In this manner, I have been able to clean successfully and to market in acceptable condition eggs graded as "heavy-dirty" and to hold these eggs under storage conditions for many months without any loss of eggs, whereas a control batch of the same eggs, maintained under the same storage conditions, suffered an economically severe loss. Thus, the machine and the process of the present invention makes it possible to clean adequately eggs with a wet sanding operation whereby the eggs can be cleaned, even though graded as "heavy-dirty," and maintained sterile under storage conditions for many months.

I claim:

A machine for cleaning and preserving eggs comprising a conveyor for moving eggs continuously through a series of treatment stations, said treatment stations comprising: a first station having means for spraying a mixture of sand and water on the eggs on said conveyor to clean the eggs, means for collecting sprayed sand and water into a body, and means for heating and maintaining the collected sand and water body at a temperature of about 140° F.; a second station having means for spraying an aqueous fluid at a temperature of about 212° F. on the eggs; the third station having means for flowing heated air over the eggs on said conveyor to dry the eggs; and a fourth station having means for spraying sterile oil on said eggs.

HARRY ALFRED MULVANY.

REFERENCES CITED

The following references are of record in the file of this patent:

UNITED STATES PATENTS

| Number | Name | Date |
|---|---|---|
| Re. 20,914 | Aitken | Nov. 15, 1938 |
| 604,621 | Kunkel | May 24, 1898 |
| 649,652 | Wilson et al. | May 15, 1900 |
| 680,152 | Huntley | Aug. 6, 1901 |
| 805,029 | Reichhelm | Nov. 21, 1905 |
| 876,757 | Winterlich | Jan. 14, 1908 |
| 1,282,251 | Lueders | Oct. 22, 1918 |
| 1,520,424 | McCullough | Dec. 23, 1924 |
| 1,530,415 | Roussel | Mar. 17, 1925 |
| 2,014,646 | Christian et al. | Sept. 17, 1935 |
| 2,225,482 | Mulvany | Dec. 17, 1940 |
| 2,408,648 | Inman | Oct. 1, 1946 |
| 2,429,742 | Barnes | Oct. 28, 1947 |
| 2,500,396 | Barker | Mar. 14, 1950 |
| 2,502,616 | Cranmer et al. | Apr. 4, 1950 |